UNITED STATES PATENT OFFICE.

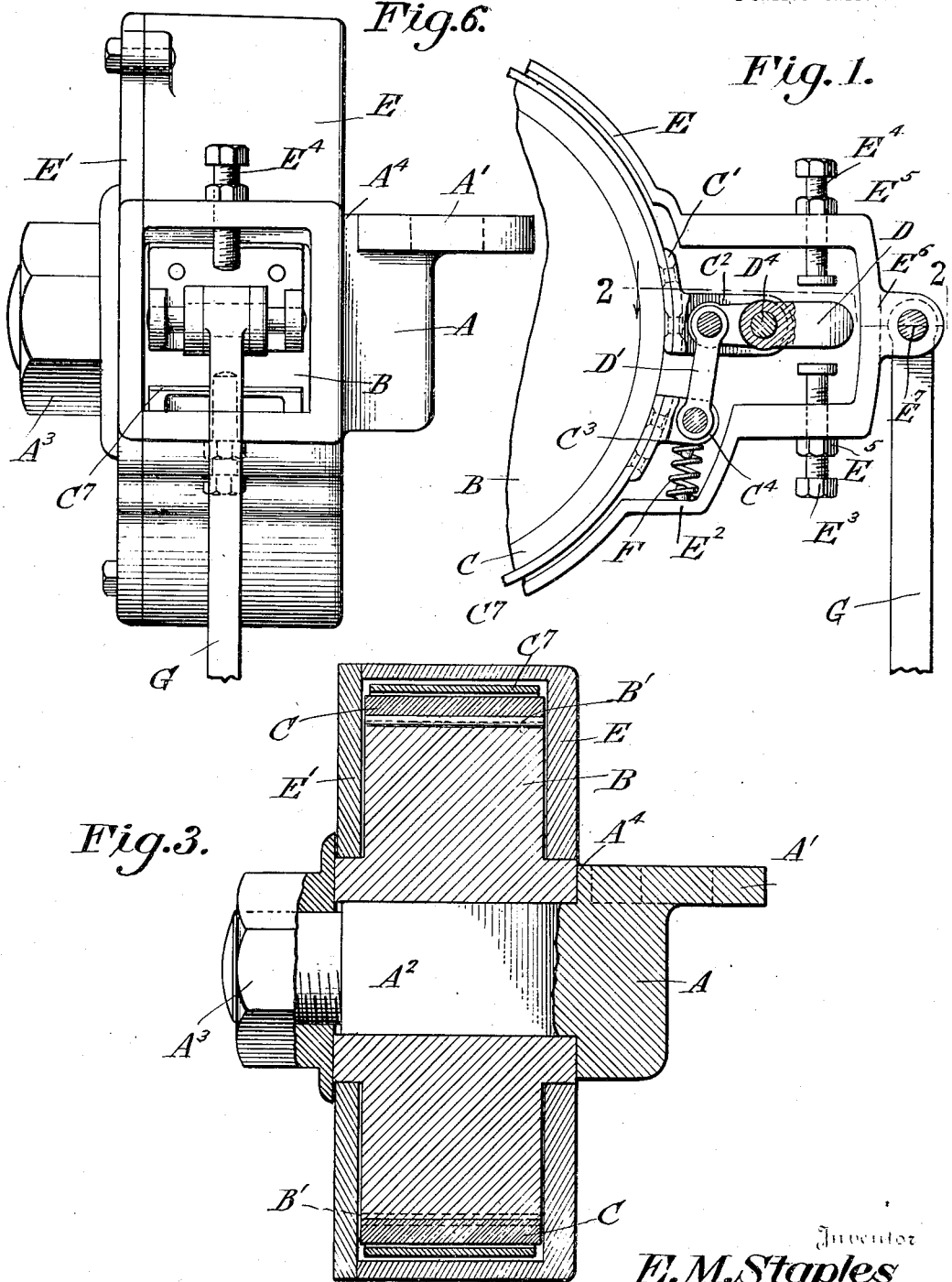

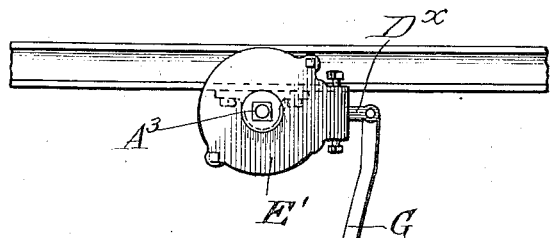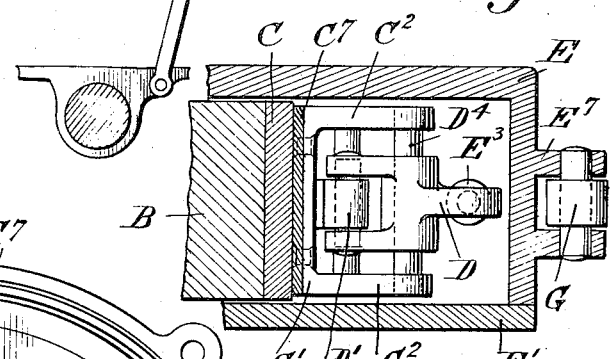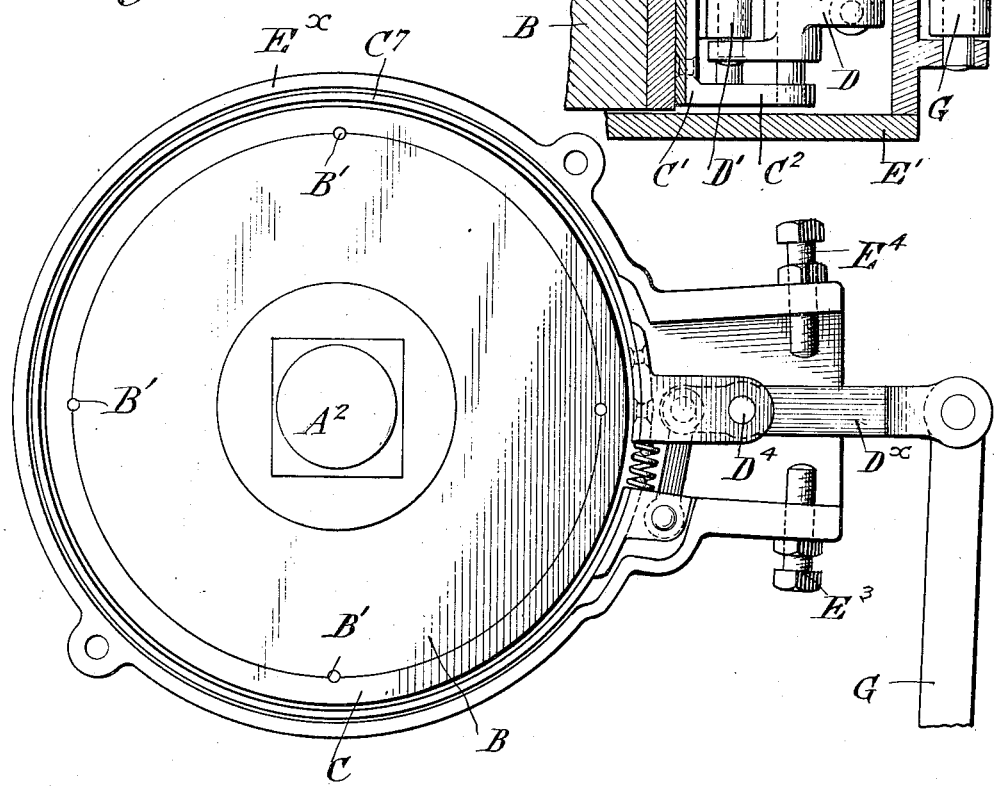

ELIAL M. STAPLES, OF ELIZABETH, NEW JERSEY.

AUTOMATIC REBOUND-GOVERNOR.

1,211,981.　　　　　Specification of Letters Patent.　　Patented Jan. 9, 1917.

Application filed March 3, 1916. Serial No. 81,954.

*To all whom it may concern:*

Be it known that I, ELIAL M. STAPLES, a citizen of the United States, residing at Elizabeth, in the county of Union and State of New Jersey, have invented certain new and useful Improvements in Automatic Rebound-Governors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in mechanism for eliminating all sudden shocks or jars to automobiles and other vehicles, usually caused by ruts, stones and the like, and it has for its object to provide a device of this character which is simple in construction and having very few parts.

A further object is to present a device which will automatically arrest and hold the springs of a vehicle to prevent the sudden expansion of same after the said springs have been compressed by sudden contact with ruts, stones or other obstacles and also to permit of a gradual release of said springs after said obstacles have been passed.

The invention comprises various details of construction, combinations and arrangements of parts which will be hereinafter fully described, shown in the accompanying drawings and then specifically defined in the appended claims.

My invention is illustrated in the accompanying drawings, in which:

Figure 1 is a view partly in section of the gripping and releasing mechanism. Fig. 2 is a section taken on line 2—2 of Fig. 1. Fig. 3 is a vertical section. Fig. 4 is a view showing a slight modification. Fig. 5 is an enlarged side elevation of the device shown in Fig. 4, the cover plate being removed, and Fig. 6 is an end view of the same.

Reference now being had to the details of the drawings by letter, A designates a supporting bracket having a flange $A'$ and adapted to be secured to the frame of an automobile. Extending at right angles from the flange $A'$ is a squared stub shaft $A^2$, threaded on its outer end to receive a nut $A^3$, as shown in Fig. 3 of the drawings. An annular hub member B, made preferably of aluminum and having a squared central opening, is interposed on the stub shaft $A^2$ between the nut $A^3$ and a shoulder $A^4$, formed at the intersection of the flange $A'$ with the stub shaft $A^2$ and is thus held against rotation thereon. Said hub member B has secured on its outer periphery, by means of pins $B'$, a hardened steel ring C, the outer face of which serves as a gripping surface for a Raybestos gripping band $C^7$ which surrounds the hub member B and steel ring C, and has secured thereto at one end a plate $C'$ having laterally extending ears $C^2$ between which is a pivot pin $D^4$ having pivotally mounted thereon a lever D, the inner end of which is connected by a link $D'$ to a plate $C^3$ secured to the opposite end of the steel band $C^7$, said plate $C^3$ having ears $C^4$ between which the lower end of the link $D'$ is pivoted, as shown clearly in Fig. 1 of the drawings.

A dustproof casing E surrounds the above described parts and has secured thereto a cover plate $E'$, as shown. A spring F is interposed between the ears $C^4$ and an offset $E^2$ in the casing E. The outer end of the lever D is normally positioned between an adjustable pushing screw $E^3$ and an adjustable pulling screw $E^4$, suitably mounted in the casing or housing E and provided with lock nuts $E^5$. The extension $E^6$ of the casing has two ears $E^7$ between which is pivoted the upper end of a bar G, the lower end being connected to the spring clip on the axle of a vehicle.

It will be seen that, when the wheel of an automobile, not shown, comes into contact with an obstruction, the axle and clip are thrown suddenly upward, pushing the hub B carrying the pushing screw $E^3$ into contact with the outer end of the lever D which, through the medium of the link $D'$ and ears $C^4$, will open the gripping band $C^7$ slightly, permitting said band to slide easily around the stationary hub. On the rebound or moving of the body of the vehicle away from the axle, the bar G is pulled in the opposite direction, which will bring the headed screw $E^4$ into contact with the upper surface of the lever D, rocking the same, and will, by means of the link $D'$, cause the gripping band $C^7$ to firmly grip the outer surface of the ring C, thereby preventing undue shock or vibrations to the body of the vehicle.

In Figs. 4 and 5 of the drawings, I have shown a slight modification of the invention in which the lever G has pivotal connection with the lever D× which allows the springs to act normally without bringing into play the gripping band but, in the event of the vehicle to which the device is attached going through a rut or deep depression, the vehicle spring will be compressed and the lever D×, the casing and the band connected therewith will be given an upper axial movement, thus loosening the friction band and, on a sudden rebound, the lever D× will swing in the opposite direction, thus causing the friction band to frictionally grip the circumference of the member C and preventing a sudden expansion of the vehicle spring.

What I claim to be new is:—

1. A rebound governor for vehicle springs, comprising a support, a hub mounted thereon and held against rotation, a casing mounted for turning movement upon the hub, a friction band interposed between the casing and the hub, members pivotally connected together and connected one with one end of the band and the other with the other end of the band, and means carried by the casing for engaging one of the said members when the casing is turned with relation to the hub to cause the band to frictionally engage the periphery of the hub.

2. A rebound governor for vehicle springs, comprising a support, a hub mounted thereon and held against rotation, a casing mounted for turning movement upon the hub, a friction band interposed between the casing and the hub, ears carried at one end of the band, a lever fulcrumed to the ears, means operatively connecting the lever with the other end of the band, and means provided upon the casing for engaging the lever when the casing turns upon the hub to cause the band to frictionally engage the hub.

3. A rebound governor for vehicle springs, comprising a hub mounted thereon and held against rotation, a casing mounted for turning movement on the hub, a friction band interposed between the casing and the hub, spring means operating upon the band to maintain the same at normal condition, a lever pivotally connected with one end of the band, a link operatively connecting the lever with the other end of the band, and means carried by the casing and adapted to engage the lever to cause the band to frictionally engage the hub.

4. A rebound governor for vehicle springs, comprising a hub, a casing surrounding the hub and movable with relation thereto, a band interposed between the casing and the hub, said casing having an extension, adjustable screws carried by the extension, a lever pivotally connected with one end of the band and having an end portion disposed between the screws, and a link operatively connecting the lever with the other end of the band.

5. A rebound governor for vehicle springs, comprising a hub mounted thereon and held against rotation, a casing mounted for turning movement on the hub, a friction band interposed between the casing and the hub, a lever pivotally connected with one end of the band, means operatively connecting the lever with the other end of the band, and means carried by the casing for engaging the lever when the casing is moved with relation to the hub to cause the band to frictionally engage the hub.

In testimony whereof I hereunto affix my signature in presence of two witnesses.

ELIAL M. STAPLES.

Witnesses:
 EMMA L. BENTTENMILLER,
 JOHN MILLER.